(12) United States Patent
Shimase et al.

(10) Patent No.: US 12,151,954 B2
(45) Date of Patent: Nov. 26, 2024

(54) AUTOMATIC ANALYZER

(71) Applicant: Hitachi High-Tech Corporation, Tokyo (JP)

(72) Inventors: Akihiro Shimase, Tokyo (JP); Kazumi Kusano, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 601 days.

(21) Appl. No.: 17/596,056

(22) PCT Filed: Mar. 11, 2020

(86) PCT No.: PCT/JP2020/010629
§ 371 (c)(1),
(2) Date: Dec. 2, 2021

(87) PCT Pub. No.: WO2020/261659
PCT Pub. Date: Dec. 30, 2020

(65) Prior Publication Data
US 2022/0315449 A1 Oct. 6, 2022

(30) Foreign Application Priority Data
Jun. 26, 2019 (JP) .................. 2019-118761

(51) Int. Cl.
*B01L 3/00* (2006.01)
*B01D 19/00* (2006.01)
(Continued)

(52) U.S. Cl.
CPC .............. *C02F 1/20* (2013.01); *B01D 19/00* (2013.01); *G01N 35/00663* (2013.01); *G01N 35/1004* (2013.01)

(58) Field of Classification Search
CPC ........ C02F 1/20; C02F 2103/04; B01D 19/00; B01D 19/0031; B01D 19/0036; G01N 35/00663; G01N 35/1004; G01N 35/1016
See application file for complete search history.

(56) References Cited

FOREIGN PATENT DOCUMENTS

| JP | H08160054 A | * | 6/1996 | ............... G01N 1/00 |
| JP | 3123748 U | | 7/2006 | |

(Continued)

OTHER PUBLICATIONS

International Preliminary Report on Patentability (PCT/IB/338 & PCT/IB/373) issued in PCT Application No. PCT/JP2020/010629 dated Jan. 6, 2022, including English translation of document C2 (Japanese-language Written Opinion (PCT/ISA/237), filed on Dec. 2, 2021) (five (5) pages).

(Continued)

*Primary Examiner* — Jennifer Wecker
*Assistant Examiner* — Oyeleye Alexander Alabi
(74) *Attorney, Agent, or Firm* — Crowell & Moring LLP

(57) ABSTRACT

This automated analyzer comprises a first system 11 that does not need to use degassed water, a second system 12 for which it is preferable to use degassed water and that comprises a degassing device 21 for producing degassed water and a second pump 19 for delivering the degassed water, and a tank 1 having formed therein a first compartment 4 for storing water to supply to the first system 11 and a second compartment 5 for storing degassed water to supply to the second system 12. The second system 12 comprises a circulation system, which comprises a suction flow path 20 and return flow path 24 for connecting the degassing device 21, the second pump 19, and the second compartment 5 of the tank 1, and a usage system, which comprises a discharge flow path 22 and connection flow path 27 for connecting the degassing device 21 and a usage unit for using the degassed (Continued)

water. Provided inside the tank 1 are a partition 3 for forming the first compartment 4 and second compartment 5 and a water passage part 6 where water moves between the first compartment 4 and second compartment 5.

9 Claims, 7 Drawing Sheets

(51) Int. Cl.

| | | |
|---|---|---|
| *B01F 23/00* | (2022.01) | |
| *B01F 23/41* | (2022.01) | |
| *B01F 101/23* | (2022.01) | |
| *B01L 9/00* | (2006.01) | |
| *B01L 9/02* | (2006.01) | |
| *B23Q 17/24* | (2006.01) | |
| *C02F 1/20* | (2023.01) | |
| *C07K 14/705* | (2006.01) | |
| *C12M 1/00* | (2006.01) | |
| *C12M 1/34* | (2006.01) | |
| *C12M 3/00* | (2006.01) | |
| *C12Q 1/04* | (2006.01) | |
| *C12Q 1/18* | (2006.01) | |
| *C12Q 1/686* | (2018.01) | |
| *G01N 21/3577* | (2014.01) | |
| *G01N 21/359* | (2014.01) | |
| *G01N 21/39* | (2006.01) | |
| *G01N 21/45* | (2006.01) | |
| *G01N 21/64* | (2006.01) | |
| *G01N 21/77* | (2006.01) | |
| *G01N 21/78* | (2006.01) | |
| *G01N 27/414* | (2006.01) | |
| *G01N 30/12* | (2006.01) | |
| *G01N 30/68* | (2006.01) | |
| *G01N 30/70* | (2006.01) | |
| *G01N 30/72* | (2006.01) | |
| *G01N 30/88* | (2006.01) | |
| *G01N 33/00* | (2006.01) | |
| *G01N 33/18* | (2006.01) | |
| *G01N 33/50* | (2006.01) | |
| *G01N 33/53* | (2006.01) | |
| *G01N 33/543* | (2006.01) | |
| *G01N 33/68* | (2006.01) | |
| *G01N 33/74* | (2006.01) | |
| *G01N 35/00* | (2006.01) | |
| *G01N 35/10* | (2006.01) | |
| *G06T 7/00* | (2017.01) | |
| *G06T 7/90* | (2017.01) | |
| *H10K 10/46* | (2023.01) | |
| *H10K 85/00* | (2023.01) | |
| *H10K 85/20* | (2023.01) | |

(56) References Cited

FOREIGN PATENT DOCUMENTS

| | | |
|---|---|---|
| JP | 2010-8105 A | 1/2010 |
| JP | 2013-213771 A | 10/2013 |
| JP | 2015-81909 A | 4/2015 |

OTHER PUBLICATIONS

International Search Report (PCT/ISA/210) issued in PCT Application No. PCT/JP2020/010629 dated Jun. 16, 2020 with English translation (four (4) pages).

Japanese-language Written Opinion (PCT/ISA/237) issued in PCT Application No. PCT/JP2020/010629 dated Jun. 16, 2020 (three (3) pages).

* cited by examiner

[FIG. 1]
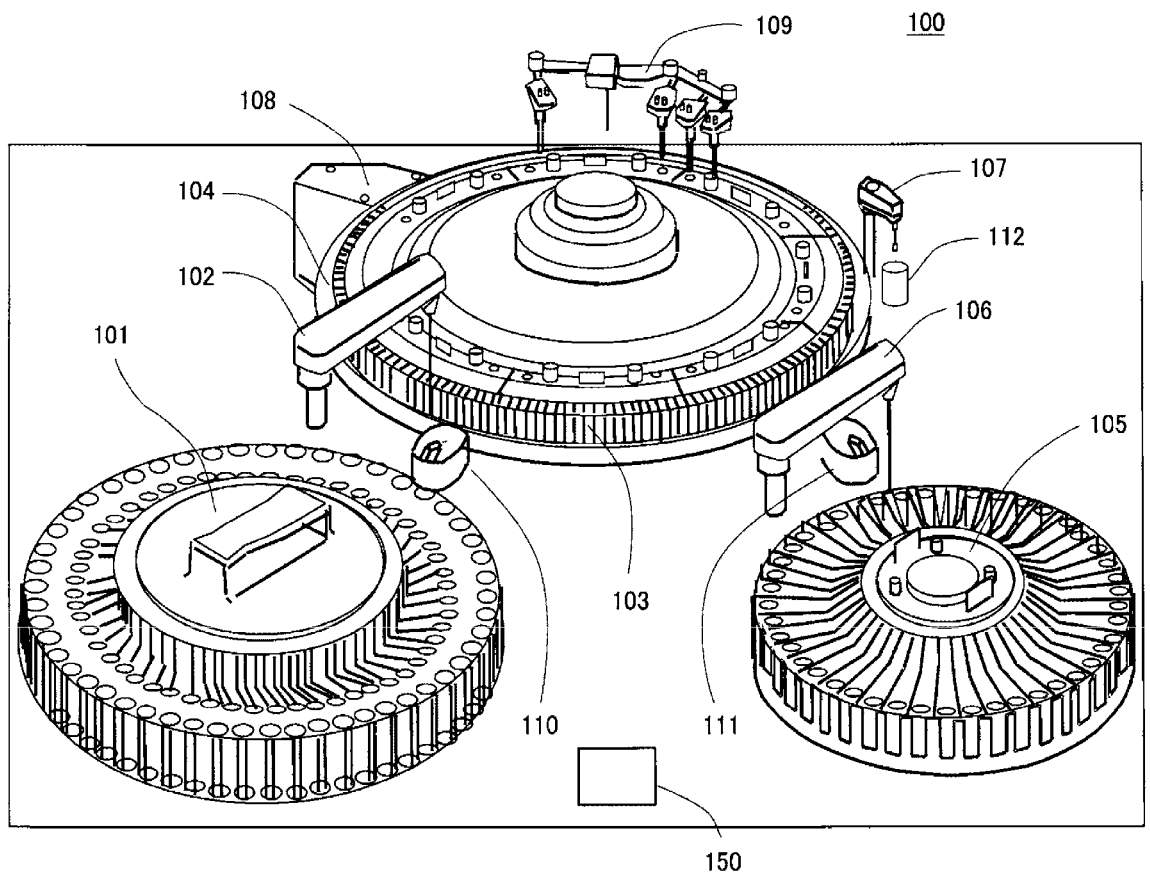

[FIG. 2]
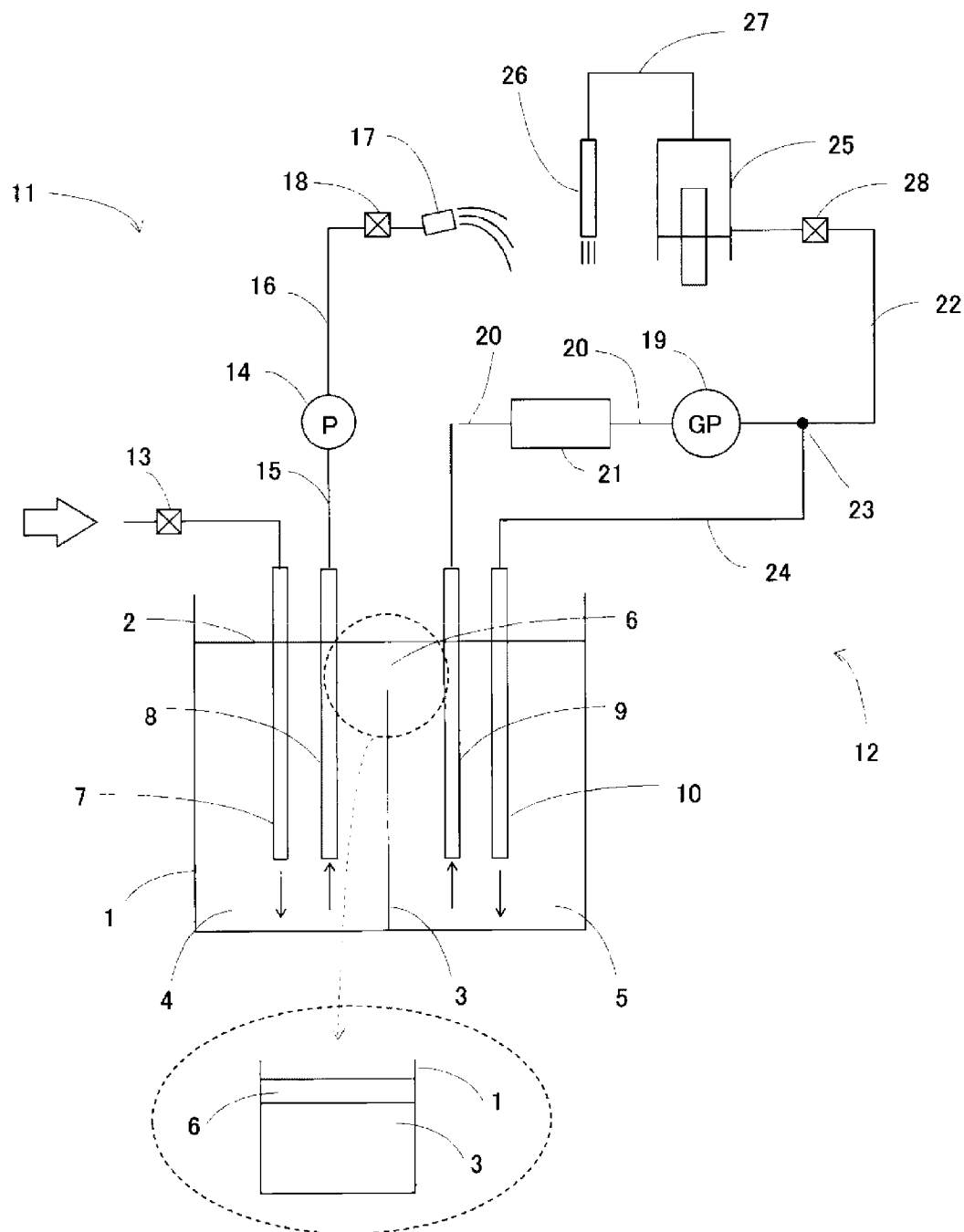

[FIG. 3]
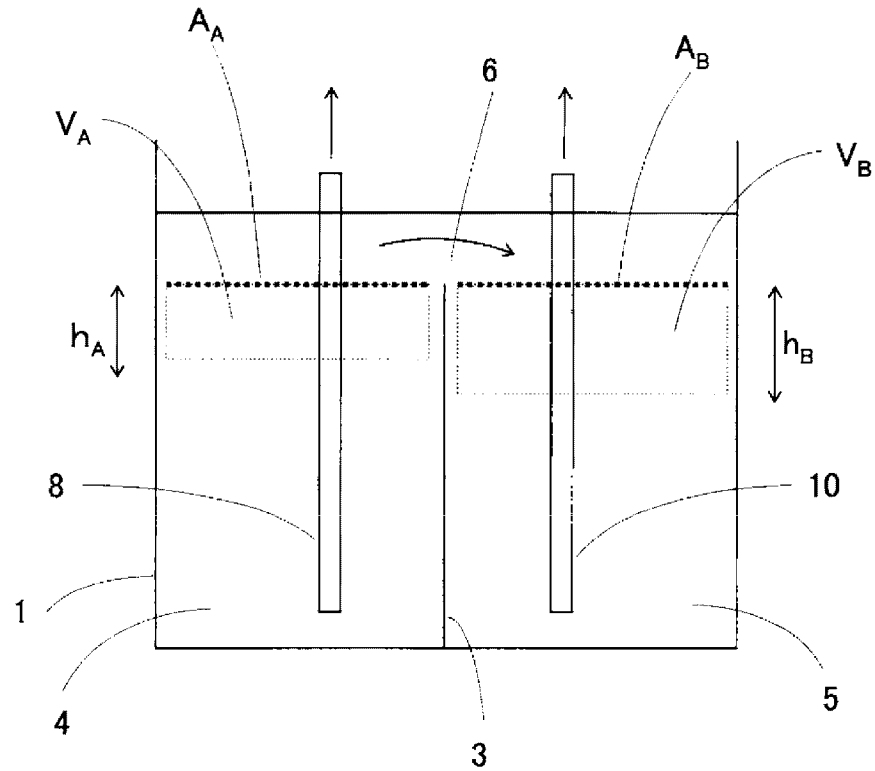
[FIG. 4]
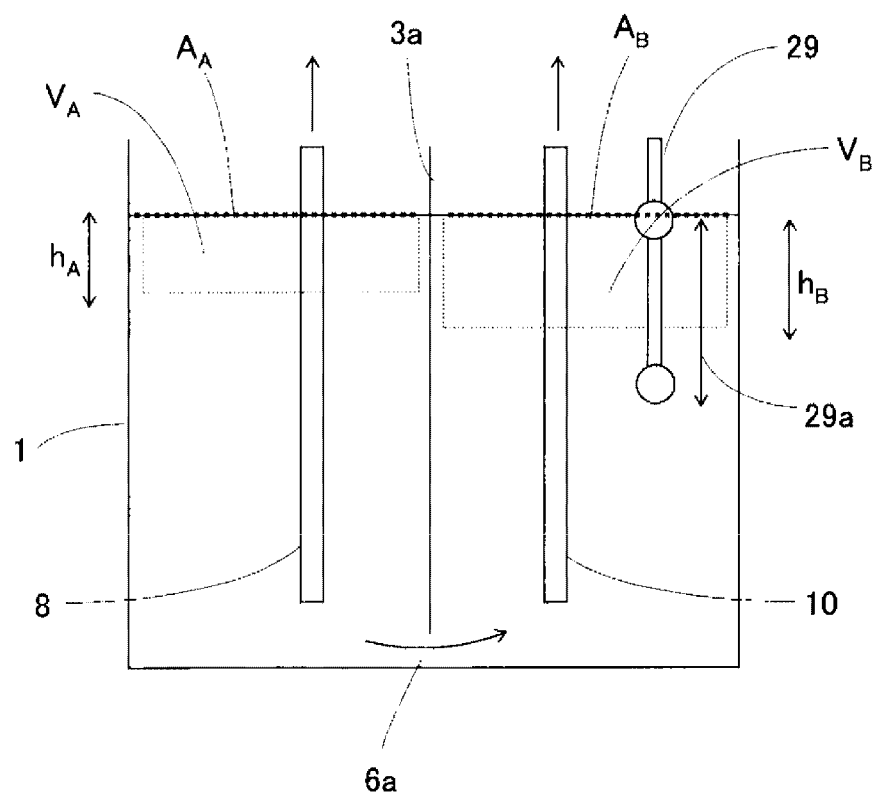

[FIG. 5]
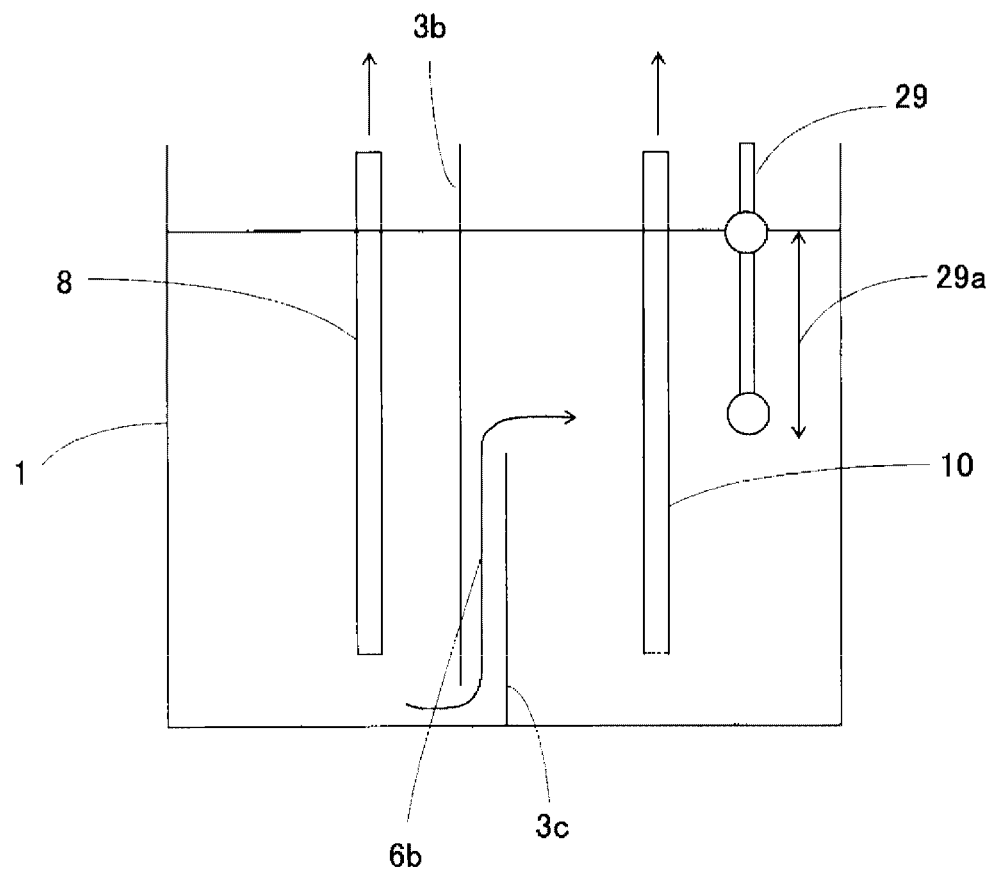
[FIG. 6]
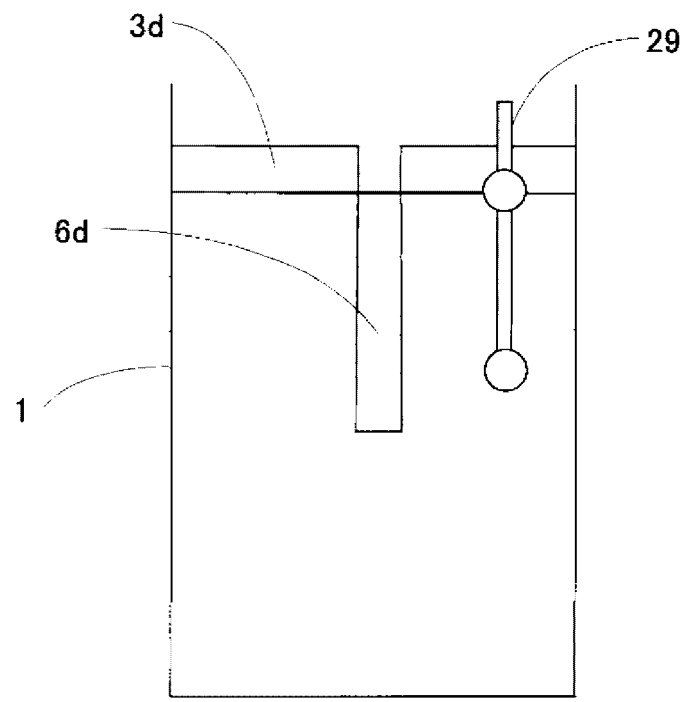

[FIG. 7]
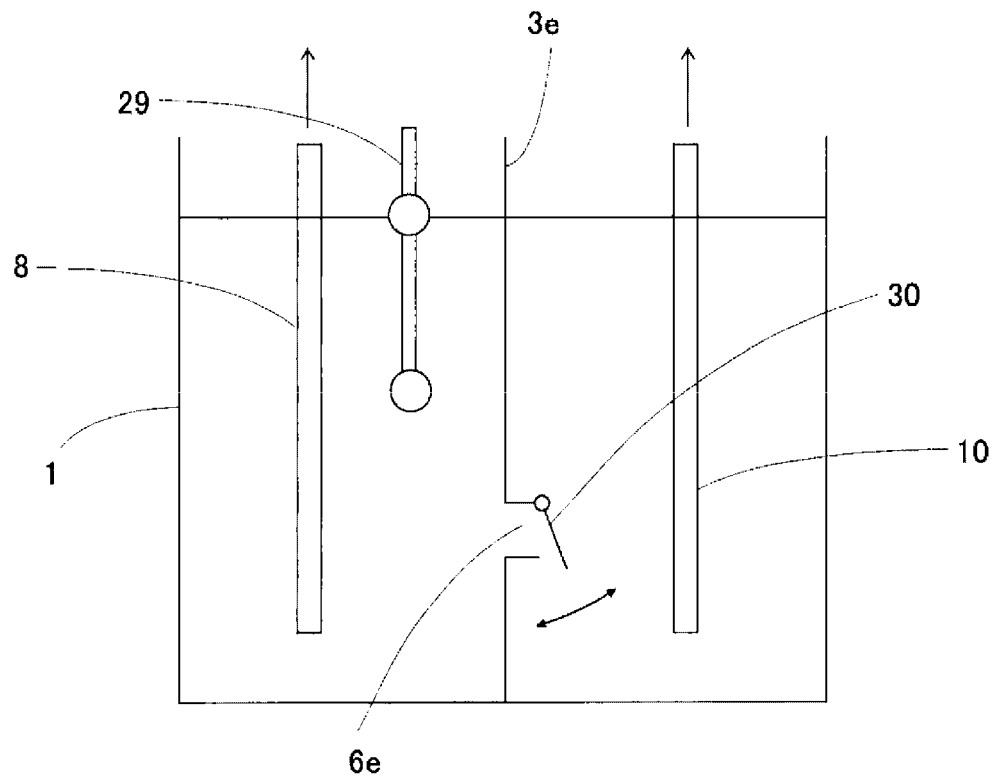
[FIG. 8]
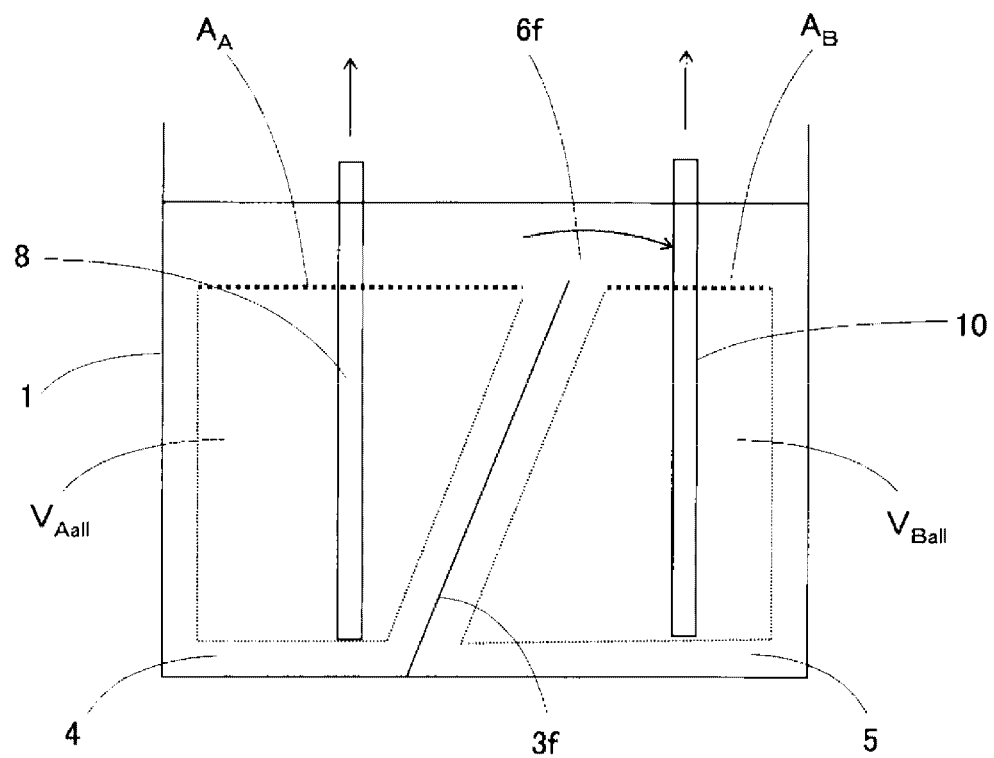

[FIG. 9]
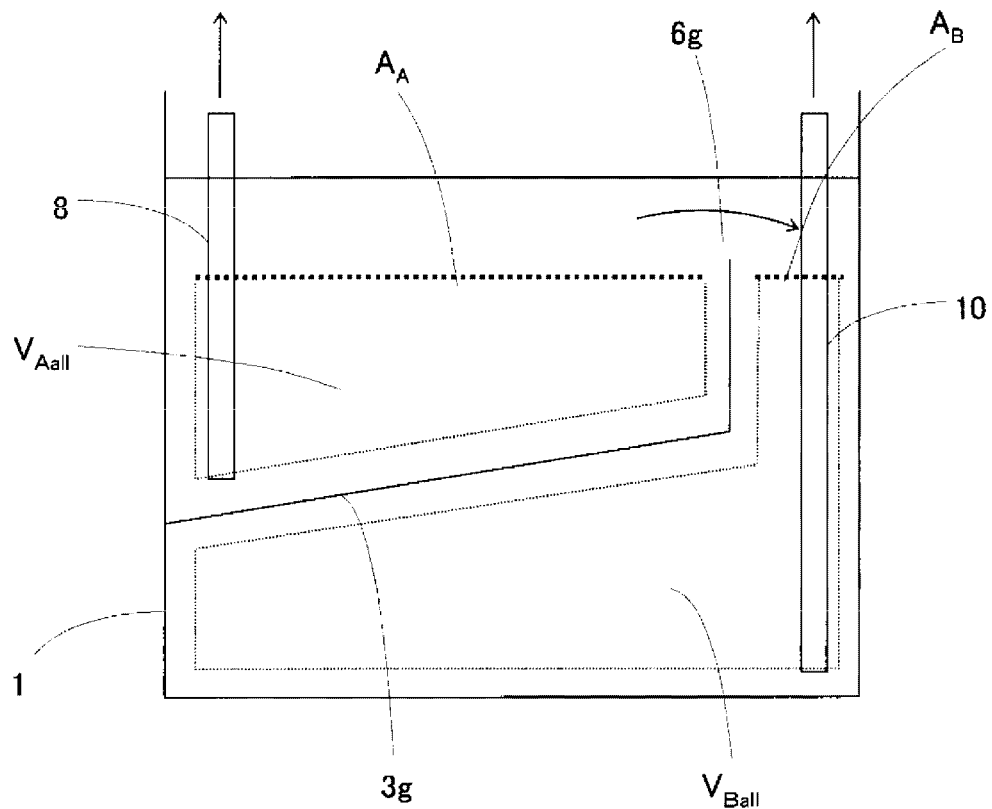
[FIG. 10]
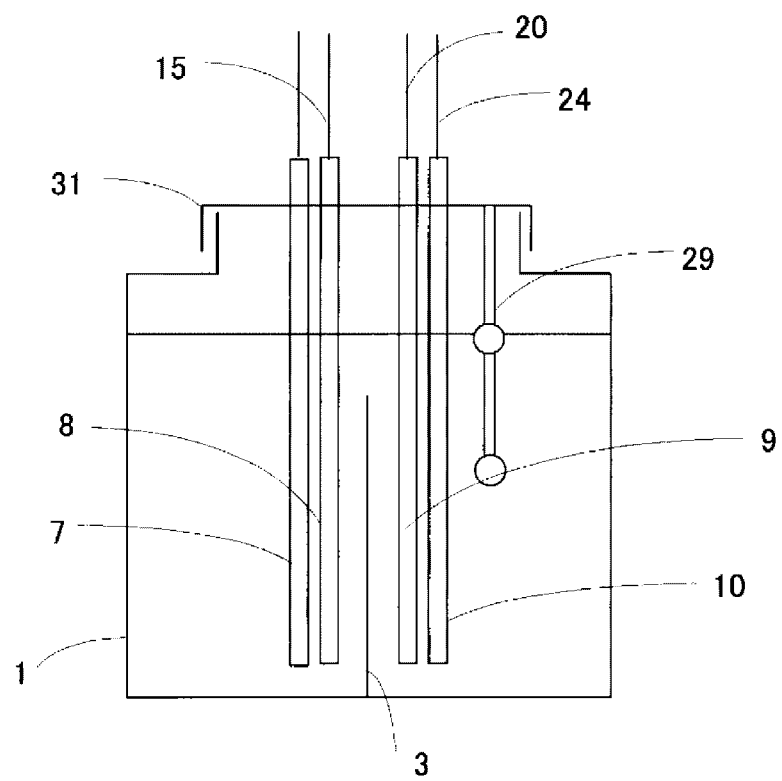

[FIG. 11]
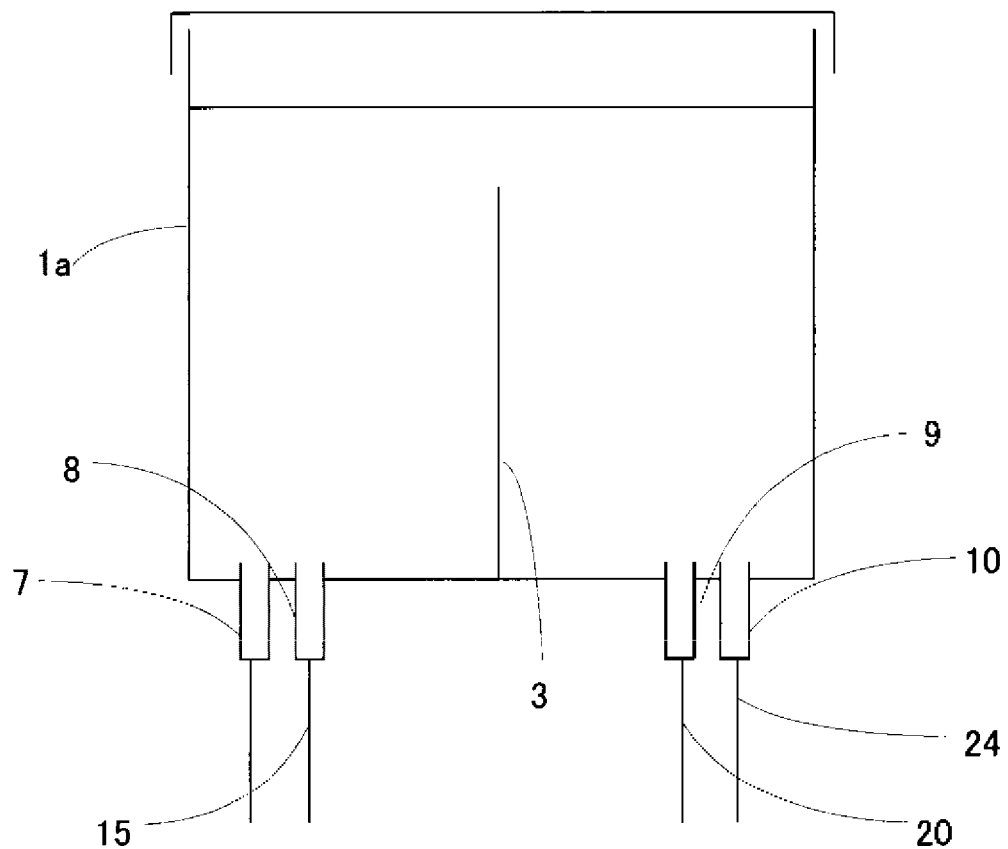

AUTOMATIC ANALYZER

TECHNICAL FIELD

The present invention relates to an automatic analyzer that performs qualitative and quantitative analysis on samples such as blood and urine.

BACKGROUND ART

For the purpose of improving an insufficient degassing performance accompanying speeding up of a device, PTL 1 describes an automatic analyzer including a water supply pump that supplies a liquid, a degassing device that degasses the liquid supplied by the water supply pump, a circulation flow path that returns a degassed liquid to a flow path before degassing, and at least one of a sample sampling mechanism and a reagent sampling mechanism that uses the degassed liquid, in which each sampling mechanism includes a water supply control valve, a pressure switching valve is installed inside the circulation flow path, the degassed liquid is supplied to the sample sampling mechanism and reagent sampling mechanism while the pressure switching valve is closed, and the degassed liquid circulates in the degassing device via the circulation flow path while the pressure switching valve is open.

CITATION LIST

Patent Literature

PTL 1: JP Utility Model Registration No. 3123748

SUMMARY OF INVENTION

Technical Problem

Many of the automatic analyzers use syringe pumps as a dispensing mechanism, and it is preferable to fill the inside with an incompressible fluid such as water (hereinafter, referred to as system water) in order to propagate the pressure instantly and accurately.

Since air bubbles in the system water will affect the pressure propagation, it is preferable to use degassed water as the system water in order to improve dispensing accuracy, and the automatic analyzer having such a configuration is described in PTL 1 described above.

Here, it is unnecessary to use the degassed water as the system water for purposes other than pressure propagation in the dispensing mechanism. Therefore, when the degassed water is supplied to a place where the degassed water does not need to be used, a mechanism for producing and storing the degassed water such as the degassing device becomes large, and the device itself becomes large, and thus it is preferable to avoid this situation.

In PTL 1, the degassed liquid is returned to the flow path before degassing and circulated many times to improve the insufficient degassing performance. In addition, PTL 1 describes an example in which a small buffer tank is provided when a large amount of water is required.

However, if this buffer tank is provided separately from the tank that supplies water to the device as described in PTL 1, the device becomes large and complicated, and thus it is clear that there is room for further miniaturization and simplification.

An object of the invention is to provide an automatic analyzer capable of miniaturizing and simplifying a system that supplies and uses system water as compared with related art.

Solution to Problem

The invention includes a plurality of means for solving the above problems, and one example thereof is an automatic analyzer including a first system that does not need to use degassed water, a second system where it is preferable to use the degassed water and that includes a degassing device for producing the degassed water and a pump for delivering the degassed water, and a common tank where a first compartment for storing water to be supplied to the first system and a second compartment for storing the degassed water to be supplied to the second system are formed, in which the second system includes a circulation system that includes pipes that connect the degassing device, the pump, and the second compartment of the common tank, and a usage system that includes pipes that connect the degassing device and a usage unit that uses the degassed water, and the inside of the common tank is provided with a partition for forming the first compartment and the second compartment and a water passage part where water moves between the first compartment and the second compartment.

Advantageous Effect

According to the invention, it is possible to miniaturize and simplify the system for supplying and using the system water as compared with the related art. Problems, configurations, and effects other than those described above will be further clarified with the following description of embodiments.

BRIEF DESCRIPTION OF DRAWINGS

FIG. 1 is a layout diagram of an automatic analyzer according to an embodiment of the invention.

FIG. 2 is a schematic configuration diagram of a cleaning system of the automatic analyzer of the embodiment.

FIG. 3 is a diagram illustrating an example of a partition related to a tank storing cleaning water of the automatic analyzer of the embodiment.

FIG. 4 is a diagram illustrating another example of the partition related to the tank of the automatic analyzer of the embodiment.

FIG. 5 is a diagram illustrating another example of the partition related to the tank of the automatic analyzer of the embodiment.

FIG. 6 is a diagram illustrating another example of the partition related to the tank of the automatic analyzer of the embodiment.

FIG. 7 is a diagram illustrating another example of the partition related to the tank of the automatic analyzer of the embodiment.

FIG. 8 is a diagram illustrating another example of the partition related to the tank of the automatic analyzer of the embodiment.

FIG. 9 is a diagram illustrating another example of the partition related to the tank of the automatic analyzer of the embodiment.

FIG. 10 is a diagram illustrating another example of tank of the automatic analyzer of the embodiment.

FIG. 11 is a diagram illustrating another example of the installation of pipes connected to the tank of the automatic analyzer of the embodiment.

DESCRIPTION OF EMBODIMENTS

An embodiment of an automatic analyzer of the invention will be described with reference to FIGS. 1 to 11.

First, a schematic overall configuration of the automatic analyzer according to the present embodiment will be described with reference to FIG. 1. FIG. 1 illustrates an overall schematic configuration of the automatic analyzer according to the embodiment of the invention.

An automatic analyzer 100 illustrated in FIG. 1 is a device that automatically analyzes a sample, and includes a sample disk 101, a sample dispensing mechanism 102, reaction cells 103, a reaction tank 104, a reagent disk 105, a reagent dispensing mechanism 106, a stirring mechanism 107, a photometer 108, a cell cleaning mechanism 109, cleaning tanks 110 and 111, a cleaning tank 112, and a control unit 150.

The sample disk 101 is an apparatus for setting sample containers containing samples in a device, and holds a plurality of sample containers. In addition, in addition to or in place of the sample disk 101, a conveyance mechanism for conveying a sample holder holding one sample container or a sample rack holding a plurality of sample containers can be provided.

A plurality of reaction cells 103 where a sample such as blood or urine reacts with a reagent are stored in the reaction tank 104 in a state of being separated from each other at predetermined intervals along a circumferential direction. Constant temperature water flows in the reaction tank 104 so as to keep the reaction cells 103 and a reaction liquid therein at a constant temperature.

The reagent disk 105 is a storage container in which a plurality of reagent bottles containing reagents corresponding to measurement items can be stored in a circumferential shape. The reagent disk 105 is kept cold.

The sample dispensing mechanism 102 is installed between the reaction tank 104 and the sample disk 101, and is configured to be rotatable and vertically movable in an arc shape. A sample probe is provided at a tip thereof.

The sample probe moves while drawing an arc around a rotary shaft of the sample dispensing mechanism 102 to execute various dispensing operations of aspirating the sample for measurement from the sample container or the reaction cell 103 and discharging the sample to the reaction cell 103.

The reagent dispensing mechanism 106 is installed adjacent to the reaction tank 104 and the reagent disk 105 and is configured to be rotatable and vertically movable in an arc shape, and a reagent probe is provided at the tip thereof.

The reagent probe moves while drawing an arc around the rotary shaft of the reagent dispensing mechanism 106 to execute the dispensing operation of aspirating the reagent from the reagent bottle and discharging the reagent to the reaction cell 103.

The stirring mechanism 107 includes, for example, a stirring blade or a spatula-shaped rod (not illustrated) provided at the tip, and performs stirring by infiltrating the stirring blade or rod into the reaction liquid, which is a mixture of the sample and the reagent in the reaction cell 103, and rotating the stirring blade or the rod. In addition, the stirring mechanism 107 is not limited to such a mechanism, and may be a mechanism based on ultrasonic waves.

The photometer 108 is a device for performing a colorimetric analysis of the reaction liquid obtained by making the sample reacting with the reagent in the reaction cell 103, and is disposed to face a light source (not illustrated) disposed inside the reaction tank 104 so as to sandwich the reaction cells 103.

The cell cleaning mechanism 109 is a device that aspirates the reaction liquid for which analysis has been completed and cleans the reaction cell 103.

The washing tank 110 for washing the sample probe of the sample dispensing mechanism 102 is installed between the reaction tank 104 and the sample disk 101. In addition, the washing tank 111 for washing the reagent probe of the reagent dispensing mechanism 106 is installed between the reaction tank 104 and the reagent disk 105. Further, the cleaning tank 112 for cleaning the stirring mechanism 107 is installed between the reaction tank 104 and the stirring mechanism 107 to prevent contamination.

The control unit 150 is connected to the apparatus in the automatic analyzer 100 described above, and controls an overall operation of the automatic analyzer 100. The control unit 150 is a computer including a CPU, a memory, and the like, and performs arithmetic processing for obtaining a concentration of a predetermined component in the sample from a detection result of the photometer 108.

The control of the operation of each apparatus by the control unit 150 is executed based on various programs recorded in a storage device. In addition to various programs used for the measurement of the sample, the storage device stores various parameters input via an input device, information on a measurement target sample (sample type information, and the like), measurement results, and the like.

In addition, control processing on the operation executed by the control unit 150 may be integrated into one program, may be divided into a plurality of programs, or may be a combination thereof. Further, a part or all of the programs may be implemented by dedicated hardware, or may be modularized.

Further, the control unit 150 of the present embodiment executes a control that enables the analysis to be started after the water is degassed by the degassing device 21 for a certain period of time from the start-up of the automatic analyzer 100. Details of the above will be described below.

In such an automatic analyzer, the cleaning tanks 110, 111, and 112 and the cell cleaning mechanism 109 use non-degassed water to clean the target apparatus. On the other hand, in the sample dispensing mechanism 102 and the reagent dispensing mechanism 106, the degassed water is used during the dispensing operation of the sample and the reagent or during internal washing. In addition, as blank water in the reaction cell 103 or the constant temperature water in the reaction tank 104, either the degassed water or the non-degassed water may be used.

The above is the overall configuration of the automatic analyzer 100.

The analysis processing of the sample performed by the automatic analyzer 100 as described above is generally executed according to the following procedure.

First, the sample container containing the sample to be analyzed is installed on the sample disk 101, and is rotated and moved to a sample sorting position.

The sample dispensing mechanism 102 discharges the aspirated sample into the reaction cell 103 on the reaction tank 104, the reagent aspirated from the reagent bottle on the reagent disk 105 is further added by the reagent dispensing mechanism 106 to the reaction cell 103, and the sample and the reagent in the reaction cell 103 are mixed and stirred by the stirring mechanism 107.

Then, optical characteristics of light passing through the reaction liquid held in the reaction cell 103 from the light source by the photometer 108 are measured by the photometer 108, and the measurement result is transmitted to the control unit 150.

The control unit 150 obtains the concentration of a specific component in the sample by the arithmetic processing based on the transmitted measurement result. Notification of an analysis result is given to a user via a display device and the analysis result is recorded in the storage device.

Next, details of a cleaning system, which is an example of a mechanism using the degassed water and the non-degassed water of the automatic analyzer 100 of the present embodiment, will be described with reference to FIG. 2. FIG. 2 is a schematic configuration diagram of the cleaning system of the automatic analyzer of the invention.

As illustrated in FIG. 2, water 2 is filled inside a tank 1. A partition 3 is provided inside the tank 1, and the tank 1 is divided into a first compartment 4 for storing water to be supplied to a first system 11 and a second compartment 5 for storing the degassed water to be supplied to a second system 12.

In addition, the partition 3 does not completely partition the first compartment 4 and the second compartment 5, and is provided with a water passage part 6.

The water passage part 6 secures a passage for the water to move between the first compartment 4 and the second compartment 5, and allows the water 2 stored in the spaces to move back and forth. However, easiness of moving back and forth can be limited.

A water supply pipe 7 and a first aspiration pipe 8 are inserted in the first compartment 4, and a second aspiration pipe 9 and a return pipe 10 are inserted in the second compartment 5.

A water usage system of the device is divided into the first system 11 that does not need to use the degassed water and the second system 12 where it is preferable to use the degassed water, the first system 11 aspirates and uses water from the first compartment 4 through the first aspiration pipe 8, and the second system 12 aspirates and uses water from the second compartment 5 through the second aspiration pipe 9.

Water is supplied to the tank 1 from an external water supply source through the water supply pipe 7. A water level is controlled by a water level sensor (not illustrated), and a water supply valve 13 is controlled so as to keep the water level within a certain range.

In the first system 11, the water aspirated by a first pump 14 through the first aspiration pipe 8 and a first aspiration flow path 15 is used through a first discharge flow path 16. For example, a cleaning tank 17 is used as a usage destination of the first system 11, and an outer surface of a nozzle used in the analysis can be cleaned. The discharge of cleaning water is controlled by a valve 18.

In addition, the cleaning tank 17 is a general term for the cleaning tanks 110, 111, and 112 and the cell cleaning mechanism 109 described above.

Further, although not illustrated, there are other usage destinations other than the cleaning tank 17, and the tip of the first discharge flow path 16 is branched for each usage destination, each branch includes a valve, and the discharge is controlled by each valve.

In the second system 12, the water is aspirated by a second pump 19 through the second aspiration pipe 9 and a second aspiration flow path 20. A degassing device 21 is provided in the middle of the second aspiration flow path 20, and the aspirated water is degassed when passing through the degassing device 21.

The degassing device 21 may be made of a hollow fiber membrane of silicon, and by creating a negative pressure on the outside of the hollow fiber membrane, when a liquid passes through the inside of the hollow fiber membrane, only gas in the liquid is separated from a wall surface of the hollow fiber.

The tip of the second pump 19 is connected to a second discharge flow path 22, but a part of the second pump 19 is branched at a branch 23 and returned to the second compartment 5 via a return flow path 24 and the return pipe 10.

A circulation system includes the return flow path 24 and the aspiration flow path 20 that connects the degassing device 21, the second pump 19, and the second compartment 5 of the tank 1, and a usage system includes a connection flow path 27 and the discharge flow path 22 that connects the degassing device 21 and a usage unit that uses the degassed water.

For example, the sample dispensing mechanism 102 or the reagent dispensing mechanism 106 is used as the usage destination of the second system 12, and the sample dispensing mechanism 102 or the reagent dispensing mechanism 106 includes a syringe pump 25, a nozzle 26, and a connection flow path 27 thereof.

The nozzle 26 may be moved to the sample container or the reaction cell 103 by a nozzle moving mechanism (not illustrated).

Since it is necessary to instantly and accurately propagate a pressure fluctuation generated by the syringe pump 25 to the nozzle 26, it is preferable that the system water used inside the sample dispensing mechanism 102 and the reagent dispensing mechanism 106 is the degassed water.

After the dispensing is completed, the inside of the nozzle 26 needs to be cleaned, and the discharge of the water used at that time is controlled by a valve 28.

A plurality of dispensing mechanisms may be used, and usage destinations other than the dispensing mechanism where it is preferable to use the degassed water may be used.

The tip of the second discharge flow path 22 is branched for each of these usage destinations, each branch includes a valve, and the discharge is controlled by each valve.

It is preferable to dispose the aspiration ports of the first aspiration pipe 8 and the second aspiration pipe 9 near the lower side of the tank 1 so as to reduce the possibility that air bubbles are present by floating bubbles generated during water supply or changes in room temperature, etc.

Discharge ports of the water supply pipe 7 and the return pipe 10 do not need to be under the tank 1, whereas by disposing these discharge ports at positions lower than a water surface, it is possible to further prevent a fact that air will be entrained when the water surface falls such that dissolved air is increased, and thus it is preferable that these discharge ports are also below the water surface.

A diameter of the nozzle 26 may be made extremely small in order to dispense a small amount with high accuracy. Accordingly, in order to clean the inside of the nozzle 26, it is preferable to use a type of second pump 19 that can apply high pressure, such as a gear pump.

Since liquid passes through the hollow fiber membrane of the degassing device 21, if a flow path resistance is large and an aspiration pressure of the second pump 19 is insufficient, another pump may be further provided in front of the degassing device.

Alternatively, since it is possible to perform degassing in a circulating manner, it is conceivable to reduce the flow path resistance even if a degassing ability at the time of one passage is reduced, and it is possible to adopt a configuration which does not include another pump. If a small degassing device with a small flow path resistance can be used, the device may be miniaturized and a cost may be reduced.

Next, the details and variations of the partition 3 will be described with reference to FIGS. 3 to 9. FIGS. 3 to 9 are diagrams illustrating examples of a partition related to a tank that stores cleaning water of the automatic analyzer of the present embodiment.

The partition 3 includes a single rectangular parallelepiped plate as illustrated in the lower side of FIG. 2, and is provided to prevent the degassed water returned to the tank 1 after passing through the degassing device 21 from spreading to the entire tank 1 and being used for the first system 11 which does not need to use the degassed water. Accordingly, wasteful use of the degassed water may be prevented, and the dissolved oxygen concentration may be efficiently reduced.

In addition, the first compartment 4 and the second compartment 5 may be completely partitioned by the partition 3, but there is a problem that the device will be complicated because it is necessary to control the water level in each compartment, and it is necessary to provide the water level sensor and the water supply valve in each compartment and control the water levels separately.

Therefore, in the invention, the inside of the tank 1 is not completely partitioned by the partition 3, and the water passage part 6 capable of allowing the water 2 to move back and forth is provided in a part of the partition 3.

It is preferable that a cross-sectional area of the water passage part 6 is made small as long as there is no trouble for the water to move back and forth. In this way, it is preferable to prevent the degassed water from diffusing toward a first compartment 4 side.

In addition, when water flows from the second compartment 5 that uses the degassed water to the first compartment 4 that uses the non-degassed water through the water passage part 6, this case is still better than a case where no partition 3 is present at all, but there is still the problem that waste will occur. Therefore, it is preferable that the water flow of the water passage part 6 is unidirectional from the first compartment 4 to the second compartment 5. FIG. 3 is for illustrating characteristics of the partition 3 for that purpose. In FIG. 3, the tank 1 is the same as the tank 1 in FIG. 2, but the water supply pipe 7 and the return pipe 10 are not illustrated for ease of understanding. The same applies to the following FIGS. 4 to 9.

In order to create a flow of the water 2 from the first compartment 4 to the second compartment 5 as illustrated in FIG. 3, the water surface drop in the second compartment 5 should be made faster than the water surface drop in the first compartment 4.

Specifically, if water consumption per unit time of the first system 11 is $V_A$, water consumption per unit time of the second system 12 is $V_B$, a cross-sectional area of the first compartment 4 is $A_A$ and a cross-sectional area of the second compartment 5 is $A_B$ when the tank 1 is viewed from an upper surface side in a vertical direction, the water surface drops $h_A$ and $h_B$ per unit time in the first compartment 4 and the second compartment 5 are $h_A = V_A/A_A$(1) $h_B = V_B/A_B$(2), respectively.

Since $V_A$ and $V_B$ may be considered to be known in an operation of the device, $h_A < h_B (= V_A/A_A < V_B/A_B)$, that is, from the above Equations (1) and (2), it is preferable to provide the partition 3 at a position where $A_A/A_B$, which a ratio of the cross-sectional area $A_A$ of the first compartment 4 to the cross-sectional area $A_B$ of the second compartment 5, satisfies the relation of $A_A/A_B > V_A/V_B$ with respect to $V_A/V_B$, which is the ratio of the water consumption $V_A$ per unit time of the first compartment 4 to the water consumption $V_B$ per unit time of the second compartment 5.

By providing the partition 3, the tank 1 may be provided with a function of storing the degassed water, and the device configuration may be simplified without separately providing a buffer tank.

Next, variations of the partition 3 and the water passage part 6 will be described with reference to FIG. 4 and the subsequent figures.

The water passage part 6 does not need to be provided on an upper portion side inside the tank 1. For example, there is one water level sensor having a certain detection range, and the water level sensor detects a lower limit of the water level to supply water, detects an upper limit, and controls to stop the water supply.

When trying to control the water levels of both the first compartment 4 and the second compartment 5 with this water level sensor, if a lower limit side of a boundary of the water passage part 6 is above the lower limit of the detection range of the water level sensor, when the water surface falls below the lower limit of the water passage part 6, the water level of a compartment on the side where the water level sensor is not installed is unknown. In such a case, it is conceivable to provide the water level sensors separately in the first compartment 4 and the second compartment 5.

It is conceivable to lower the lower limit of the water passage part 6, but as described above, there is a concern that enlarging the water passage part 6 will not ensure an efficient amount of the degassed water. In order to overcome such a disadvantage, it is conceivable to provide a water passage part 6a at the lower portion as illustrated in FIG. 4.

In FIG. 4, a water level sensor 29 has a detection range 29a, and a partition 3a is provided with the water passage portion 6a at the lower end. In such a case, the water surface drop $h_A$ in the first compartment 4 and the water surface drop $h_B$ in the second compartment 5 are considered to be the same as those illustrated in FIG. 3 in which the water passage part 6a is at the top, and the flow from the first compartment 4 to the second compartment 5 can be secured by providing the partition 3a at a position where the cross-sectional area $A_A$ of the first compartment 4 and the cross-sectional area $A_B$ of the second compartment 5 satisfy $h_A < h_B$.

Also in such a case, it is preferable that the aspiration ports of the first aspiration pipe 8 and the second aspiration pipe 9 are located at lower positions of the tank 1 as described above.

However, when the water passage part 6a is provided in the lower portion of the tank 1, if the water passage part 6a and the aspiration port of the second aspiration pipe 9 are close to each other, the non-degassed water that flows from the first compartment 4 to the second compartment 5 may be in a manner of first-in first-out, and thus it can be said that there is room for further obtaining an effect of circulating degassing by making the non-degassed water pass through the degassing device 21 a plurality of times to sufficiently degas by improving this.

Therefore, it is preferable to increase a distance between an outlet of a water passage part 6b on the second compartment 5 side and the aspiration port of the second aspiration pipe 9 by forming partitions 3b and 3c by two plates, and providing a space between the partitions 3b and 3c made of two or more plates, as illustrated in FIG. 5.

The partition 3c as illustrated in FIG. 5 rises from a bottom surface of the tank 1 on the second compartment 5 side with respect to the partition 3b, and a position of an upper end thereof is located below a detection lower limit of the water level sensor 29. With such partitions 3b and 3c, the water passage part 6b may be separated from the aspiration port of the second aspiration pipe 9.

The narrow space between an opening of the water passage part 6b seen from the first compartment 4 and the opening of the water passage part 6b seen from the second compartment 5 can be regarded as the water passage part 6b in the entire space. When distinguishing from the one-plane partition 3 and the water passage part 6 as illustrated in FIG. 3, this space may be called a water passage area. If the water passage area is present, the diffusion of the water 2 inside the tank 1 is less likely to occur, which is advantageous for securing an efficient amount of the degassed water. In order to enhance the effect, the partition 3b and the partition 3c may be arranged alternately. Further, when providing the partitions, it is preferable that the outlet of the water passage area on the second compartment 5 side is on the upper portion side of the second compartment 5.

In addition, the partition is formed of a single rectangular parallelepiped plate, and a height of the water passage part does not have to be uniform in a horizontal direction.

For example, when the tank 1 is rotated 90 degrees from an illustrated direction of FIG. 3 and the like, a partition 3d may be formed by a slit in the vertical direction as illustrated in FIG. 6. This slit-shaped opening serves as a water passage part 6d.

It is preferable that the slit is cut below the detection lower limit of the water level sensor 29. An area of the water passage part 6d is controlled because it does not spread in the horizontal direction, and the diffusion of the degassed water can be prevented.

In addition, the water passage part may be shaped like a circular or polygonal hole, and a plurality of slit-shaped or hole-shaped water passage parts may be provided on one partition. In such a case, the arrangement of the partitions can be devised to provide the water passage area, and a plurality of water passage parts and water passage areas having various shapes can be combined.

Further, as illustrated in FIG. 7, in order to form a one-way flow from the first compartment 4 to the second compartment 5 more reliably, it is possible to constitute a partition 3e with a single plate, constitute a water passage part 6e with an opening hole provided on the partition 3e between the first compartment 4 and the second compartment 5, and provide the opening hole with a check valve 30 that allows a flow of water from the first compartment 4 to the second compartment 5 and obstructs the flow of the degassed water from the second compartment 5 to the first compartment 4.

In the check valve 30, when the water level in the second compartment 5 drops below the water level in the first compartment 4, the non-degassed water flows from the first compartment 4 to the second compartment 5 due to a pressure difference, but the degassed water does not flow to the first compartment 4 side because the valve is closed from the second compartment 5.

In addition, in this case, in order to control the water level in both compartments with one water level sensor, it is preferable to install the water level sensor 29 in the first compartment 4.

The partition 3 is unnecessarily formed of a single vertical plate.

For example, as illustrated in FIG. 8, a partition 3f can be provided diagonally inside the tank 1. In such a case, the water level drops in the first compartment 4 and the second compartment 5 should be considered based on the cross-sectional area of each compartment when the partition 3f is viewed from above.

By providing the partition 3f, a volume ratio between the first compartment 4 and the second compartment 5 can be changed while maintaining the flow from the first compartment 4 to the second compartment 5. As a result, it is possible to exert an effect of increasing a degree of freedom in designing the tank 1.

In particular, the second compartment 5 requires a certain volume in order to maintain an efficient dissolved oxygen concentration due to the relation between the water consumption and the amount of returned water. If the first compartment 4 is made smaller, the volume of the entire tank 1 may be made smaller.

Here, in the case of the vertical one-plane partition 3 as illustrated in FIG. 2 and the like, a cross-sectional area ratio that realizes the water level drop becomes the volume ratio as it is, so that it cannot be reduced to a value equal to or larger than the area ratio. Meanwhile, since the volume ratio can be changed while maintaining the cross-sectional area ratio for causing the targeted water surface drop by providing the partition 3f diagonally as illustrated in FIG. 8, the size of tank 1 can be reduced. As a result, the tank 1 can be further miniaturized.

FIG. 9 illustrates a case where the partition 3g is formed of a plurality of planes. Also in such a case, it is preferable to consider the water level drop of each compartment based on the cross-sectional area of each compartment when the partition 3g is viewed from above.

In addition, the partition does not necessarily have to stand from the bottom surface of the tank 1, and the partition 3g may come out from a side surface of the tank 1 as illustrated in FIG. 9. Naturally, the heights of the aspiration ports of the first aspiration pipe 8 and the second aspiration pipe 9 may be different. Also in such a case, it is preferable to aspirate water from the bottom of each compartment. By adopting such a structure, the degree of freedom in design is further increased, and the capacity of the tank 1 can be greatly reduced depending on the water consumption, which leads to further miniaturization of the device.

Further, another embodiment of the tank will be described with reference to FIGS. 10 and 11. FIG. 10 is a diagram illustrating another example of the tank of the automatic analyzer of the present embodiment, and FIG. 11 is a diagram illustrating another example of installation of the pipe connected to the tank.

In the automatic analyzer 100, the tank 1 may be cleaned for maintenance, and thus it is preferable that the tank 1 and pipes are removable from each other. In addition, the tank and the pipe will be returned to original positions after being removed, and thus it is preferable that the structure is such that the tank and the pipe can be easily returned.

Therefore, it is preferable that the tank 1 includes the water supply pipe 7 and the first aspiration pipe 8 that constitute the first system 11, the second aspiration pipe 9 and the return pipe 10 that constitute the second system 12, and a tank cap 31 that fixes the water level sensor 29, as illustrated in FIG. 10.

Further, it is preferable that the tank cap 31 is provided with a fixing position notification unit indicating a fixing position so as to prevent the orientation of the first aspiration pipe 8 of the first compartment 4 and the second aspiration pipe 9 of the second compartment 5 from being fixed in an opposite direction when being returned to original positions. As an example of the fixing position notification unit, a mark may be provided or a shape of the tank cap 31 may be asymmetrical.

In addition, as described above, the pipes do not have to be inserted from the upper portion side of the tank 1, and for example, as illustrated in FIG. 11, the water supply pipe 7, the first aspiration pipe 8, the second aspiration pipe 9, and the return pipe 10 may protrude from a bottom of a tank 1a. Further, the pipes may protrude from the side surface of the tank.

The tank and the pipe may be integrated, and the pipe and the flow path may be provided with connectors to connect the connectors to each other. It is more preferable to have a mechanism to prevent erroneous piping, such as marking the connector.

Further, the concentration of the dissolved air in the second compartment 5 is often unknown immediately after the start-up of the automatic analyzer 100. Therefore, it is preferable that the control unit 150 enables the analysis to be started after degassing the system water to a certain level by circulating the system water that passes through the degassing device 21 through the circulation system for a certain period of time from the start-up of the automatic analyzer 100. For example, it is possible to prevent the device from starting operation until a certain period of time has passed. In addition, it may be incorporated in a preparatory operation at the time of starting the device.

Next, an effect of the present embodiment will be described.

The above automatic analyzer 100 of the present embodiment includes the first system 11 that does not need to use the degassed water, the second system 12 where it is preferable to use the degassed water and that includes the degassing device 12 for producing the degassed water and the second pump 19 for delivering the degassed water, and the tank 1 where the first compartment 4 for storing water to be supplied to the first system 11 and the second compartment 5 for storing the degassed water to be supplied to the second system 12 are formed, in which the second system 12 includes the circulation system that includes the aspiration flow path 20 that connects the degassing device 21, the second pump 19, and the second compartment 5 of the tank 1, and the return flow path 24, and the usage system that includes the discharge flow path 22 that connects the degassing device 21 and the usage unit that uses the degassed water, and the connection flow path 27, and the inside of the tank 1 is provided with the partitions 3, 3a, 3b, 3c, 3d, 3e, 3f, and 3g for forming the first compartment 4 and the second compartment 5 and the water passage parts 6, 6a, 6b, 6d, 6e, 6f, and 6g where water moves between the first compartments and the second compartment 5.

With such a structure, the tank 1 that accommodates the degassed water and the non-degassed water can be shared, so that the degassed water supply system can be miniaturized and has a simple configuration, and the automatic analyzer 100 itself can be miniaturized.

In addition, since partitions 3, 3a, 3b, 3c, 3d, 3e, 3f, and 3g are provided so that $A_A/A_B$, which is the ratio of the cross-sectional area $A_A$ of the first compartment 4 to the cross-sectional area $A_B$ of the second compartment 5, is larger than $V_A/V_B$, which is the ratio of the water consumption $V_A$ per unit time of the first compartment 4 to the water consumption $V_B$ per unit time of the second compartment 5, when the tank 1 is viewed from the upper surface side in the vertical direction, the flow of the water 2 from the first compartment 4 to the second compartment 5 can be effectively formed, the degassed water can be effectively prevented from flowing to the first compartment 4 side that retains the non-degassed water, and the degassed water can be used efficiently on the side that uses the degassed water.

Further, by constituting the partition 3d with a single plate, and forming the water passage part 6d with at least one of the slit, a circular hole, and the polygonal hole provided on the partition 3d, the inside of the tank 1 can be separated with a simple configuration, and the water passage part can be secured.

In addition, by constituting the partition 3d with a single plate, constituting the water passage part 6d with the opening hole provided on the partition 3d between the first compartment 4 and the second compartment 5, and providing the opening hole with the check valve 30 that allows the flow of water from the first compartment 4 to the second compartment 5 and obstructs the flow of the degassed water from the second compartment 5 to the first compartment 4, the degassed water and the non-degassed water in the water passage part 6d can be prevented from being mixed, and the degassed water can be generated and used more efficiently.

Further, by constituting the partitions 3b and 3c with two or more plates, and providing the water passage part 6b with a space formed between the two or more plates, the degassed water and the non-degassed water in the water passage part 6b can be prevented from being mixed, and the degassed water can be generated and used more efficiently.

In addition, since the volume ratio can be changed while maintaining the cross-sectional area ratio for causing the targeted water surface drop by providing the partition 3f diagonally in a vertical direction, the size of tank 1 can be reduced. As a result, the tank 1 can be further miniaturized.

Further, since the tank 1 includes the tank cap 31 that fixes the pipes constituting the first system 11 and the second system 12, the pipes can be removed together by removing the tank cap 31, and burden on a user during maintenance can be reduced.

In addition, by providing the tank cap 31 with the fixing position notification unit that indicates the fixing position, it is possible to reliably prevent the tank cap 31 from being inserted backward such that the first system 11 and the second system 12 are fixed in opposite directions, and the degassed water and the non-degassed water are used in opposite directions, and thus the operation of the device can be greatly stabilized.

Further, since the control unit 150 that controls the operation of the apparatus in the automatic analyzer 100 is further included, and the control unit 150 enables the analysis to be started after degassing water with the degassing device 21 for a certain period of time from the start-up of the automatic analyzer 100, analytical reliability of the automatic analyzer 100 can be improved.

Others

The invention is not limited to the above embodiment, and various modifications and applications can be made thereto. The present embodiment described above has been described in detail for easy understanding of the invention, and is not necessarily limited to those including all the configurations described above.

REFERENCE SIGN LIST 1, 1a tank (common tank)
2 water
3, 3a, 3b, 3c, 3d, 3e, 3f, 3g partition
4 first compartment
5 second compartment
6, 6a, 6b, 6d, 6e, 6f, 6g water passage part
7 water supply pipe
8 first aspiration pipe
9 second aspiration pipe
10 return pipe
11 first system
12 second system
13 water supply valve
14 first pump
15 first aspiration flow path
16 first discharge flow path
17 cleaning tank
18 valve
20 second aspiration flow path
20 aspiration flow path
21 degassing device
22 second discharge flow path
22 discharge flow path
23 branch
24 return flow path
25 syringe pump
26 nozzle
27 connection flow path
28 valve
29 water level sensor
29a detection range
30 check valve
31 tank cap
100 automatic analyzer
101 sample disk
102 sample dispensing mechanism
103 reaction cell
104 reaction tank
105 reagent disk
106 reagent dispensing mechanism
107 stirring mechanism
108 photometer
109 cell cleaning mechanism
110 cleaning tank
111 cleaning tank
112 cleaning tank
150 control unit

The invention claimed is:

1. An automatic analyzer, comprising:
a first system that does not need to use degassed water;
a second system where it is preferable to use the degassed water and that includes a degassing device for producing the degassed water and a pump for delivering the degassed water; and
a common tank where a first compartment for storing water to be supplied to the first system and a second compartment for storing the degassed water to be supplied to the second system are formed, wherein
the second system includes a circulation system that includes pipes that connect the degassing device, the pump, and the second compartment of the common tank, and a usage system that includes pipes that connects the degassing device and a usage unit that uses the degassed water, and
the inside of the common tank is provided with a partition for forming the first compartment and the second compartment and a water passage part where water moves between the first compartment and the second compartment.

2. The automatic analyzer according to claim 1, wherein the partition is provided so that $A_A/A_B$, which is a ratio of a cross-sectional area $A_A$ of the first compartment to a cross-sectional area $A_B$ of the second compartment, is larger than $V_A/V_B$, which is a ratio of water consumption $V_A$ per unit time of the first compartment to water consumption $V_B$ per unit time of the second compartment, when the common tank is viewed from an upper surface side in a vertical direction.

3. The automatic analyzer according to claim 1, wherein the water passage part is formed with at least one of a slit, a circular hole, and a polygonal hole provided on the partition.

4. The automatic analyzer according to claim 1, wherein the partition is constituted with a single plate,
the water passage part is constituted with an opening hole provided on the partition between the first compartment and the second compartment, and
the opening hole is provided with a check valve that allows a flow of water from the first compartment to the second compartment and obstructs the flow of the degassed water from the second compartment to the first compartment.

5. The automatic analyzer according to claim 1, wherein the partition is constituted with two or more plates, and
the water passage part is provided with a space formed between the two or more plates.

6. The automatic analyzer according to claim 1, wherein the partition is provided diagonally in a vertical direction.

7. The automatic analyzer according to claim 1, wherein the common tank includes a tank cap that fixes pipes constituting the first system and the second system.

8. The automatic analyzer according to claim 7, wherein the tank cap is provided with a fixing position notification unit that indicates a fixing position.

9. The automatic analyzer according to claim 1, further comprising:
a control unit configured to control an operation of an apparatus in the automatic analyzer, wherein
the control unit enables an analysis to be started after degassing water with the degassing device for a certain period of time from a start-up of the automatic analyzer.

* * * * *